UNITED STATES PATENT OFFICE.

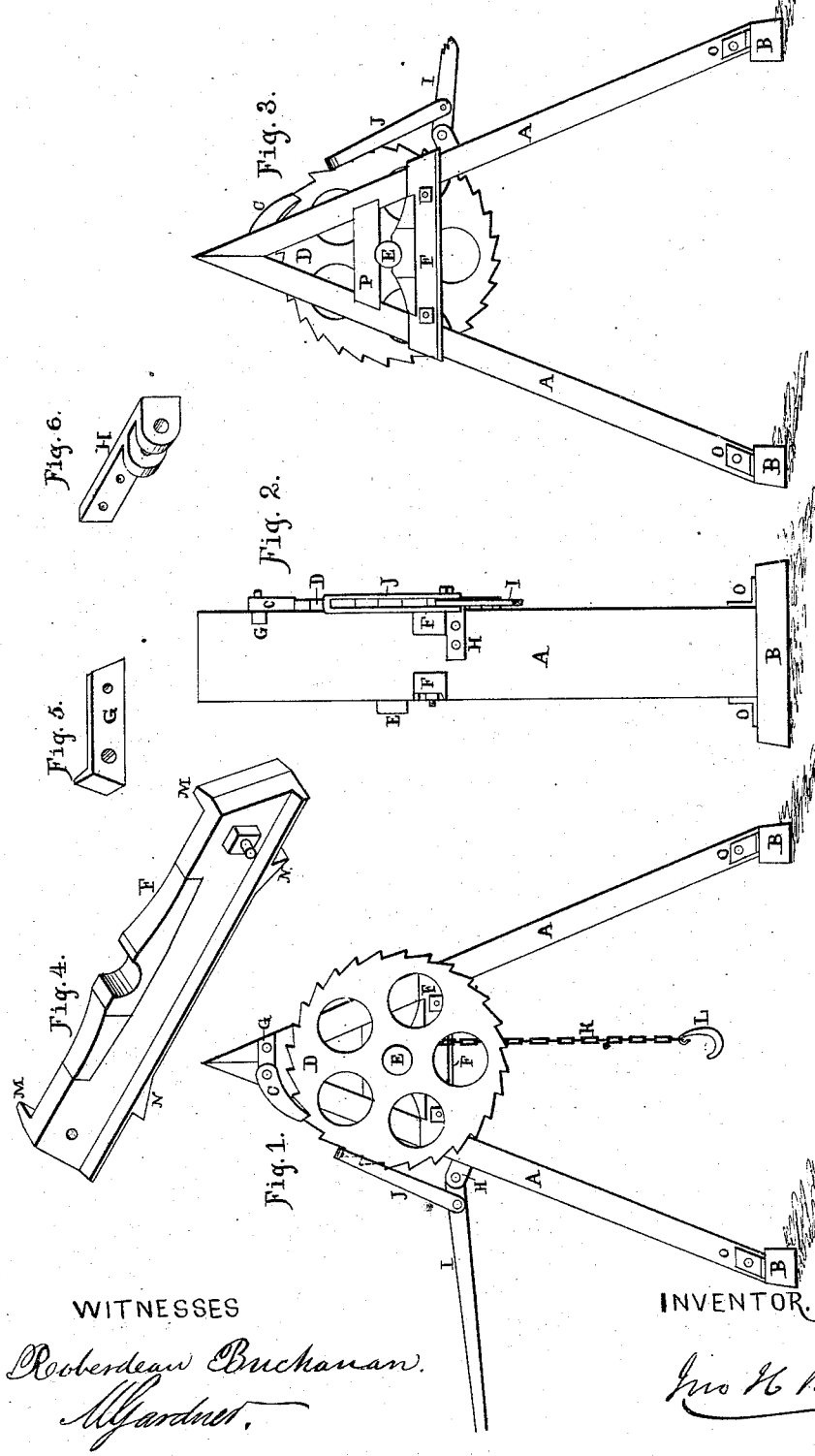

JOHN H. BARNES, OF BALTIMORE, MARYLAND.

IMPROVEMENT IN STUMP-ELEVATORS.

Specification forming part of Letters Patent No. 160,808, dated March 16, 1875; application filed February 17, 1875.

*To all whom it may concern:*

Be it known that I, JOHN H. BARNES, of Baltimore city, Maryland, have invented a novel Stump-Elevator.

The object of my invention is to pull stumps and grubs in land, and to pull up piles in rivers and harbors.

I hereby declare the following to be a full, clear, and exact description of my said invention, reference being made to the accompanying drawings, with letters of reference marked thereon.

Figure 1 represents the front view. Fig. 2 represents a side view. Fig. 3 represents the back view.

Letters A in Figs. 1, 2, and 3 represent two solid pieces of timber, joined together at the top ends and secured by bolts, with the lower ends set apart, so as to form two sides of a triangle, in form somewhat like the letter A. Letters B, Figs. 1, 2, and 3, represent sills, united to A by iron knees placed in each of the angles, as shown by letter o, Figs. 1, 2, and 3. Letters F, Figs. 1, 2, 3, and 4, represent an iron cross-piece or tie-beam let into each edge of A, and secured thereto by screw-bolts passing from one to the other on the inner side of and near to A. Letters D represent, in Figs. 1 and 2, an iron ratchet-wheel fastened to axle E. Letters E, Figs. 1, 2, and 3, represent an iron or steel axle, which is fastened to the ratchet-wheel D by a key, and rests in a curved seat on the top edge of the two tie-beams F. G, Figs. 1 and 5, represents an iron plate, let into A A near the top to give additional strength and unity, and also to hold firmly the bolt securing the pawl C. C, Figs. 1 and 2, represents a pawl, which, falling by gravitation into notches of the ratchet-wheel D, prevents a reverse motion when the lever is lifted. Letters I, Figs. 1, 2, and 3, represent a lever. Letters H, Figs. 1, 2, and 6, represent a fulcrum for the lever I, which is bolted to A just under the projecting end of the tie-beam F. Letter J, Figs. 1, 2, and 3, represents a catch-link, which is fastened to the lever I, and operates upon the teeth in the ratchet-wheel D. Letter K, Fig. 1, represents a chain secured to the shaft E, around which it winds when the machine is in operation. Letter L, Fig. 1, represents a strong hook used in connection with the chain K. Letter p, Fig. 3, represents a cross-bar let into A A, Fig. 3, to hold the shaft E in position.

The mode of using this machine in extracting stumps is to drive the strong hook L under some accessible root, or otherwise fasten it to the stump; then place the machine in position, with the back next to the stump, so as to attach the chain K to the hook; then, by hand-power, operate the lever so as to revolve the wheel, when the largest stump readily yields to the immense power thus exerted, and is lifted from its place in the ground.

When used as a pile-extractor, the hook L is fastened to the pile by the usual means; and the machine placed in position and operated by hand-power, as in the case of a stump.

The tie-beam F, Fig. 4, has shoulders M M, which lap over and impinge on the outer surface of A A, preventing A A from spreading, and materially sustain the downward pressure when in operation, and also, by shoulders N on the under edge, hold the frame from any inward strain, which several parts give to the frame-work unity and compactness of strength.

What I claim as new, and desire to secure by Letters Patent, is—

The tie-beam F, having shoulders M M N N, the frame A A, and sills B B, in combination with ratchet-wheel D, pawl C, lever I, and link J, operating as described.

JOHN H. BARNES.

Witnesses:
W. E. CHAFFEE,
HARRY COLEMAN.